United States Patent [19]
Morris et al.

[11] 4,018,460
[45] Apr. 19, 1977

[54] HOSE COUPLING

[75] Inventors: Roy H. Morris, Battle Creek; George L. Turner, Hickory Corners; Walter L. Hixon, Augusta, all of Mich.

[73] Assignee: American Stamping Company, Battle Creek, Mich.

[22] Filed: Oct. 28, 1975

[21] Appl. No.: 626,116

[52] U.S. Cl. .................. 285/39; 285/174; 285/328; 285/354; 285/379
[51] Int. Cl.² .......................... F16L 35/00
[58] Field of Search ............ 285/174, 39, 354, 40, 285/52, 353, 384, 386, 355, 328, DIG. 11, DIG. 12, 8, 379, 280; 85/32.1; 277/110, 112

[56] References Cited
UNITED STATES PATENTS

| | | | |
|---|---|---|---|
| 559,590 | 5/1896 | Miles | 285/DIG. 11 |
| 1,767,612 | 6/1930 | Pieper | 285/174 X |
| 2,307,440 | 1/1943 | Wilson | 285/DIG. 11 |
| 2,726,101 | 12/1955 | Peterson | 285/354 X |
| 2,785,911 | 3/1957 | Kaufman | 285/354 X |
| 2,837,351 | 6/1958 | Bailey | 285/354 X |

*Primary Examiner*—Dave W. Arola
*Attorney, Agent, or Firm*—Fisher, Gerhardt & Groh

[57] ABSTRACT

A hose coupling for detachably connecting a hose to a threaded fitting such as the outlet of a faucet, a male hose coupling, or a pipe and having a nut type of a housing formed of a metallic shell containing a plastic liner which has threads for attachment to the male fitting and also provides integral seal for preventing leakage from between the threaded fitting and the hose.

11 Claims, 4 Drawing Figures

U.S. Patent        April 19, 1977        4,018,460
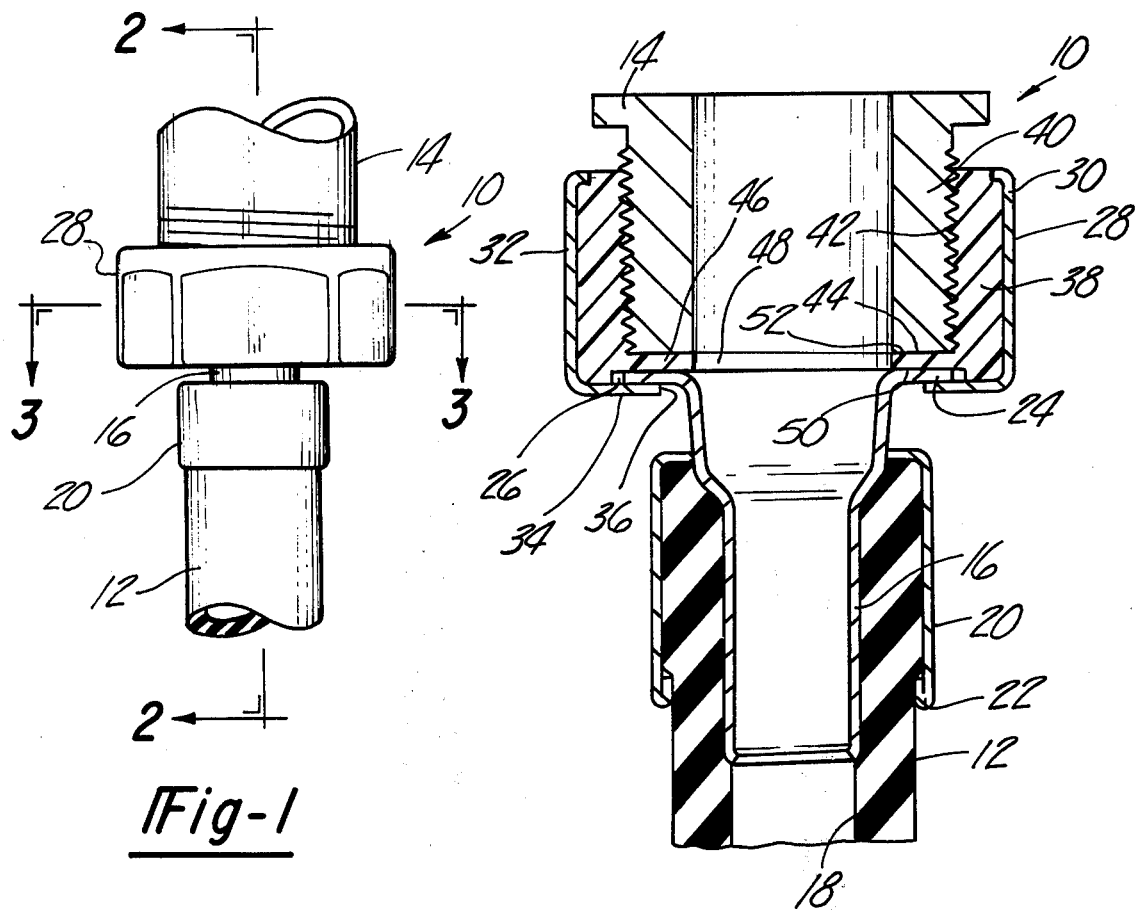
Fig-1
Fig-2
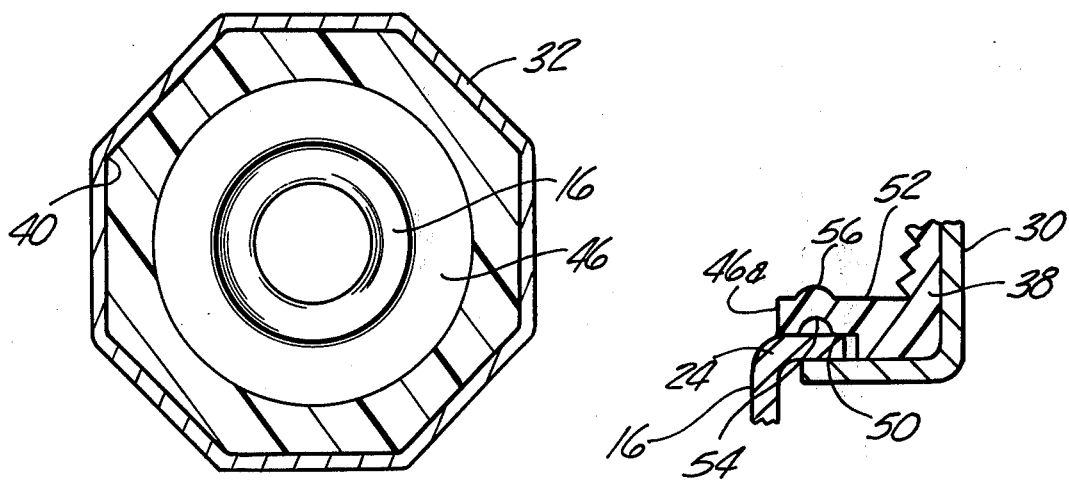
Fig-3
Fig-4

HOSE COUPLING

This invention relates more particularly to the female half of hose couplings, or the like.

Hose couplings of the female type, commonly used on the inlet end of garden hoses, are formed with a nut having a flanged tail piece adapted to be fastened to the hose and with the flanged nut formed to threadedly receive the threaded end of a faucet with an externally threaded outlet, or the male coupling half mounted on another hose. Such couplings usually employ a rubber washer type of seal which is loosely positioned in the nut to prevent leakage. The washer type seal is subject to wear which sometimes results in leakage and requires replacement. Moreover, the washer type of seal is sometimes loose or off-center in the female coupling half and does not properly seal the connection between the female coupling half and the complementary fitting to which it is joined. In addition, such washer type seals are sometimes separated and lost from the coupling when it is disconnected from it complementary fitting so that it must be replaced, thus involving considerable inconvenience. Hose couplings are sometimes sold without washers, which must be separately purchased which again involves inconvenience.

It is an object of the invention to provide a female hose coupling half in which the seal is formed integrally as a part of same.

Another object of the invention is to provide a female hose coupling half in which the seal portion, which is integral with same, is formed of a plastic material having good resistance to wear.

Another object of the invention is to provide a female hose coupling half in which the plastic member forming the seal also has an extending portion which carries the threads for engaging a male fitting to facilitate easy threaded engagement and disengagement.

The hose coupling half of the present invention includes a plastic member formed axially internal threads to threadably engage the external threads on a fitting such as the threaded outlet of a faucet, male hose coupling half, or pipe, the plastic member having a metal shell or casing which normally protects the plastic member from damage. The shell and plastic member form radial inwardly extending spaced flanges forming an annular groove rotatably receiving a collar or flange on a tubular member or tail piece sealingly connected to a hose. The radial inwardly extending flange of the plastic member forms a seal member which remains centered relative to the internal threads of the plastic member and flexes relative to the remainder of the plastic member to engage and act to form a seal between the collar on the hose tube or tail piece and the male threaded end of the faucet or pipe fitting. The flange of the plastic member may be formed substantially flat or with one or more annular grooves to enhance sealing, as will be set forth hereinafter in detail.

In the annexed drawing:

FIG. 1 is a side view of a hose coupling assembly embodying our present invention;

FIG. 2 is a longitudinal cross-sectional view showing a female hose coupling half, taken along line 2—2 FIG. 1 looking in the direction of the arrows, and which embodies the present invention, shown attached both to a hose and to a threaded fitting such as the externally threaded outlet end of a faucet or the like;

FIG. 3 is a cross-sectional end view of the hose coupling as taken along line 3—3 of FIG. 1, looking the direction of the arrows; and FIG. 4 is a fragmentary sectional view on an enlarged scale showing a modified form of a portion of the coupling shown in FIG. 2.

The female hose coupling half embodying the invention is designated generally at 10 and is adapted for connecting a hose 12 to an externally threaded male fitting portion 14 such as found on the threaded outlet end of a faucet, water pipe or male hose coupling half.

The female hose coupling half 10 comprises a tubular element or tail piece 16 which is preferable formed of brass. The tail piece 16 is adapted to be received in the bore 18 of the hose 12 and to be held nonrotatable in place by a metal ferrule 20 which preferably has an inturned end, as indicated at 22, to wedge the hose 12 between the tail piece 16 and ferrule 20 when they are fixedly joined. The hose may be held in place on the tail piece 16 by either crimping ferrule 20 onto the hose, or by expanding tail 16, or both. The female coupling half may be anchored in place by other conventional means such as by a separate hose clamp instead of by the ferrule 20, and the tubular tail piece 16 may be formed with annular ridges preferably inclined away from the end of the tail which is inside the hose, none of which are shown. The other end of tail piece 16 is formed with an external flange or collar 24 which extends radially outwardly from the axis of the tubular tail piece 16. The collar 24, FIG. 2, is received in an annular recess 26, which is within the nut assembly or housing 28, as will be hereinafter described in detail.

The housing 28, FIG. 2, includes an outer case or shell 30 preferably made of steel. The shell 30 has an axially extending generally cylindrical wall 32 merging into a radially inward extending annular flange 34. The flange 34 has an opening 36 to receive the tail piece 16 with its collar 24 disposed within the shell 30.

Fitted within the shell 30, FIG. 2, is a lining element 38 which is preferably made of plastic such as "nylon", but may be made of other suitable plastic such as "Delrin" or "Lexan". The lining element 38 has an annular wall portion 40 of relatively thick cross section to afford rigidity to the lining element 38. The annular wall portion 40 has internal threads 42 engagable with external threads on fitting 14. The threads 42 of the plastic liner 38 can be very accurately molded to insure proper engagement with the complementary threads on fittings 14.

Extending radially inwardly from the wall 40, FIG. 2, is a relatively thick bottom wall portion 44 from which a substantially thinner sealing flange 46 extends. The flange 46 has an opening 48 for passage of fluid through tail 16 and hose 12. The radial flange 46 may be formed flat as shown in FIG. 2 to present oppositely facing flat surfaces 50 and 52 engaging the surface of collar 24 of tail piece 16 and the annular end of male fitting 14, respectively, to form a fluid tight seal therebetween. The flange 46 is spaced apart slightly from the radial flange 34 formed by the shell 30 to form the annular recess 26 receiving the flange 24. The relatively thin flange portion 46 is flexible relative to the thicker and more rigid flange portion 44 so that it may deflect axially of the assembly.

Although the flange 46 is shown in FIG. 1 as having flat surfaces 50 and 52, the flange also may be formed as shown in FIG. 4 in which the surface 50 is provided with an annular groove 54 and the surface 52 is formed with an annular ridge 56 opposite to the groove 54. This construction also permits radial deflection of the flange 46a to enhance sealing between the flange 24, FIG. 2, and the fitting 14. If desired more than one groove 54 and one ridge 56 maybe formed concentrically with each other, and it is intended that the showing in FIG. 4 be considered as diagrammatically illustrating same.

When the hose coupling is put in use, the hose 12 and the attached tail piece 16 are nonrotatably anchored together and the nut with its housing 28 is rotatable so that the flange 24 of the tail piece slides or rotates in the annular groove 26 during which time the internal threads 42 on the lining element 38 of nut assembly 28 are rotatably threaded into engagement with the external threads on the fitting 14. When the end of the threaded fitting 14 comes into engagement with the top of flange 46, and is tightened in place, it clamps the flange or collar 24 of the tail piece 16 between the shell flange 34 and the plastic sealing flange 46 which may deflect axially. The flange 46 acts as a seal so that fluid is free to flow without leakage from the fitting 14 to and through the tail piece 16 and into the hose 12, or vice versa.

In fittings formed with groove 54 and ridge 56, as shown in FIG. 4, sealing between the collar 24 and fitting 14 is further facilitated by radial deflection of the flange 46a to bring the ridge 56 and the surfaces adjacent the groove 54 into tight engagement with the surfaces to be sealed.

A hose coupling has thus been provided for attachment of the end of a hose to an externally threaded fitting on another hose or faucet outlet in which the nut assembly 28 has an internally threaded plastic member 28 which permits easy threaded engagement and disengagement from a fitting and also forms an integral seal portion which is accurately aligned to enagage with and acts as a seal between the collar 24 on a tubular element 16 fitted to the hose and the fitting to which the hose coupling is attached. The plastic member is encased in a relatively rigid metallic casing 30 which with the seal portion forms an annular slot or recess 26 to rotatably receive the collar on the tubular element so as to permit rotation of the plastic member and its casing relative to the hose 12. The metal casing 28 protects the plastic member from damage and is preferably formed with flat surfaces, FIG. 1, forming a nut to receive a tool such as a wrench (not shown) to tighten the hose coupling on male fitting 14.

The embodiments of the invention in which an exclusive property or privilege is claimed are defined as follows:

1. A hose coupling comprising; a tubular element having one end adapted for fastening to a hose in nonrotatable relation thereto, a housing assembly including a shell and a lining element disposed in said shell, said lining element having internal threads adapted for threaded attachment to a fitting, said shell having a radially inwardly extending portion, said lining element having a radially inwardly extending flange spaced from the portion of said shell to form an annular groove therebetween, and a collar formed by said tubular element and extending radially outwardly from the other end thereof, said collar being rotatably disposed in said annular groove for rotational movement of said housing relative to said tubular element, said flange of said lining element forming a seal engagable in sealing relationship with said collar upon engagement of said flange by an end of said fitting.

2. The combination of claim 1 in which the radial flange of said lining is thinner in cross section than the remainder of said fitting for deflection relative thereto and into engagement with said collar upon attachment of said hose coupling to a fitting.

3. The combination of claim 1 in which said inwardly extending flange of said lining element has a first surface in engagement with said collar and an oppositely facing second surface adapted to engage a fitting.

4. The combination of claim 3 in which one of said surfaces has a ridge portion concentric with the axis of said coupling to form a sealing surface.

5. The combination of claim 3 in which one of said surfaces forms an annular groove and in which annular portions adjacent to said groove form said sealing surface.

6. The combination of claim 5 in which the other of said surfaces has a ridge portion concentric with said coupling to form a sealing surface.

7. The combination of claim 6 in which said ridge portion is formed axialy opposite to said annular groove.

8. The combination of claim 1 in which said shell is a relatively rigid metallic member and in which said fitting element is formed of a relatively resilient plastic.

9. The combination of claim 8 in which said shell has a lip portion extending radially inwardly and spaced from the flange of said shell to prevent axial displacement of said shell and lining element.

10. The combination of claim 8 in which said shell had diametrically opposed parallel flat surfaces adapted to receive a tool for rotating said housing relative to said tubular element.

11. The combination of claim 10 in which said lining element has flat surfaces complementary to said flat surfaces of said shell to prevent rotation of the latter relative to said lining element.

* * * * *

UNITED STATES PATENT OFFICE
CERTIFICATE OF CORRECTION

Patent No. 4,018,460  Dated April 19, 1977

Inventor(s) Roy H. Morris, George L. Turner, Walter L. Hixon

It is certified that error appears in the above-identified patent and that said Letters Patent are hereby corrected as shown below:

Column 1, line 41, after "formed" insert --with--.

Column 4, claim 10, line 48, "had" should read --has--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks